Patented Oct. 4, 1949

2,483,852

UNITED STATES PATENT OFFICE 2,483,852

PRODUCTION OF ACROLEIN DIACETATE

Curtis W. Smith and Douglas G. Norton, Berkeley, Calif., assignors to Shell Development Company, San Francisco, Calif., a corporation of Delaware No Drawing. Application August 26, 1946, Serial No. 693,164

7 Claims. (Cl. 260—494)

This invention relates to an improved method of preparing acrolein diacetate, the method being characterized by providing increased yields of acrolein diacetate, by adaptability to operations in the commercial scale, and by the increased economy and efficiency of execution.

Acrolein diacetate is a known organic compound and has been prepared heretofore. The methods that have been employed previously, however, have not been entirely satisfactory, particularly from the standpoint of their application on a scale commensurate with the requirements of large scale production as, for example, in continuous operations. For example, undesirably low yields and unduly long reaction times inherent in the processes heretofore proposed for the production of acrolein diacetate have limited the value of such processes as well as the effectiveness with which they may be applied to the problem at hand. Although these and similar factors often may be overlooked, or entirely disregarded, in laboratory scale preparations, they frequently may render a process entirely unsuited to large scale practice.

The process of the present invention has overcome these and similar problems associated with processes heretofore available for the preparation of acrolein diacetate by providing markedly improved yields of acrolein diacetate, by substantially increasing efficiency of operation through reduction in reaction time, by simplifying the problem of recovery of the acrolein diacetate, and by similar considerations.

These and associated objectives of the present invention are accomplished by reacting acrolein and acetic anhydride according to the herein described process and under the combined, correlated conditions of reaction that are disclosed herein. By means of this process, and the associated conditions which form a part thereof, substantial and unexpected advantages in the production of acrolein diacetate have been obtained.

In accordance with the present invention, it has been discovered unexpectedly that acrolein diacetate may be prepared in an improved manner by reacting acrolein with acetic anhydride in the presence of a small amount of sulfuric acid under the correlated conditions of a molar ratio of total acetic anhydride to total acrolein between substantially 1.05:1 and substantially 1.2:1, a reaction temperature between about 35° C. and about 70° C., preferably between about 40° C. and about 60° C., an amount of sulfuric acid present between about 0.05 and about 0.5 per cent of the total weight of acrolein and acetic anhydride, and by limiting the reaction time to a period not in excess of about one hour. By effecting reaction in accordance with this combination of steps and under the correlated conditions, it is possible to prepare acrolein diacetate in an efficient and economical manner and in excellent quality, and to obtain the acrolein diacetate in a high yield generally in excess of 90 per cent.

The process of the present invention as thus described is particularly suited to the preparation of acrolein diacetate in a continuous manner, although its advantages are not limited thereto. The relatively short reaction time which forms a part of the present process enables a desirable simplification in the equipment necessary, compared with the substantially longer reaction times heretofore employed. It also enables a desirable reduction in the amount of reaction mixture in the reaction stage of the process at any one time for a given output of acrolein diacetate, and hence eliminates the necessity for unduly large and cumbersome reaction equipment. In a preferred embodiment of the present invention, the process therefore is effected in a continuous manner.

The process of the present invention is executed by adding at a controlled rate acrolein to acetic anhydride containing between about 0.1 and about 0.5 per cent of sulfuric acid based on the total weight of reactants, in an amount corresponding to a molar ratio of total acetic anhydride to total acrolein between substantially 1.05:1 and 1.2:1. During the reaction the temperature of the reaction mixture is maintained between about 35° C. and about 70° C. Higher or lower temperatures impair the effectiveness of the process. Temperatures not over about 60° C. are preferable. Since the reaction is exothermic in character, suitable provision for dispersal of the heat generated is desirable, although the necessity of providing specific means therefor depends upon the size and shape of the reaction vessel, the rate of addition of acrolein, and similar factors. Those skilled in the art will be able to determine readily in any given instance whether the use of specific means such as cooling coils, etc., is required to maintain the temperature within the above limits. In certain cases rise in temperature may be adequately controlled or prevented by suitable regulation of the rate of addition of acrolein. In the case of continuous operations of the process, one or more streams of acrolein may be introduced into a stream of acetic anhydride containing the stated amount of sulfuric acid catalyst, and the resultant mixture of acrolein, acetic anhydride and sulfuric acid in the foregoing proportions passed through a reaction zone such as an elongated reaction tube maintained at a temperature within the stated range. The reaction tube or other reaction vessel may be jacketed or otherwise surrounded by a suitable temperature-regulating medium such as air, water, oil, etc., in order to maintain the desired constancy of temperature.

The time of reaction, in accordance with the present invention, is limited to a period not in excess of about one hour, and in the preferred cases to a period not in excess of about one-half hour. The experiments that have been carried out as an outgrowth of the present invention indicate that the feature of limiting the reaction time in this manner, in conjunction with the other conditions and steps that are employed, underlies in large part the advantageous results derived from the process. It has been discovered unexpectedly that when employing the otherwise existing conditions of the present process, and thus limiting the time of reaction, substantially higher yields of acrolein diacetate may be obtained than heretofore have been obtained. This unexpected result of the present invention renders the process of the invention particularly suited to operation in a continuous manner, since in the case of continuous operations a short reaction time is highly desirable for, and in many cases a prerequisite to, economical and efficient operation.

At the end of the desired reaction time, the reaction may be terminated by immediately subjecting the reaction mixture to distillation under reduced pressure, or by other suitable means. It is preferred, however, to terminate the reaction by adding to the reaction mixture a suitable arresting agent adapted to stop the reaction and to prevent further or possible side reactions. The arresting agent may be added as such directly to the reaction mixture or, if sufficiently soluble, it may be added in the form of a solution in a suitable organic solvent. In the case of continuous operations, a stream of an arresting agent, for example, dissolved in an organic solvent, may be introduced into a stream of the reaction mixture or otherwise mixed therewith. In the event the reaction mixture is passed through an elongated reaction tube, the point of addition of the arresting agent may be so correlated with the diameter of the tube and the linear rate of flow of reaction mixture therethrough that a residence time of the desired length of time, less than one hour, is obtained.

Any suitable alkaline material may be added to the reaction mixture in order to terminate the reaction. Thus, when as in a preferred embodiment of the present invention recovery of acrolein diacetate is to be effected by fractional distillation of the reaction mixture, there may be added to the reaction mixture prior to distillation thereof a suitably alkaline material such as sodium carbonate, potassium carbonate, alkali metal hydroxides, sodium acetate, aklaline earth metal hydroxides, and the like in an amount sufficient at least to substantially neutralize any free acid present. Such addition serves effectively to terminate the reaction period and thus prevent undesired continued reaction.

It has been found, however, that particularly advantageous results are obtained by adding to the reaction mixture prior to recovery, and especially when recovery is effected by distillation, a minor amount of a suitable organic amine in an amount sufficient to substantially neutralize the strongly acidic catalyst that is employed. Such addition of an organic amine not only serves effectively to stop reaction in the reaction mixture but also is highly efficacious in preventing possible side reactions, decomposition, or other undesirable changes during subsequent storage and/or during distillation of the reaction mixture. In addition to these advantages, the addition of a suitable organic amine has the unexpected advantage of simplifying recovery of the acrolein diacetate product by distillation. It has been found that such amines when added to the present reaction mixtures form only liquid high-boiling products that do not interfere with the distillation and that remain in the still kettle as undistilled liquid residues. On the other hand, salts or alkalies such as those referred to previously, when added to the present reaction mixtures, promote the formation of undesirable solids which frequently interfere appreciably with distillation of the reaction mixture unless additional steps are taken to effect their removal or redistillation of the initially recovered acrolein diacetate is resorted to. By means of such addition of an organic amine, it has been found possible to obtain acrolein diacetate in a highly pure state and in a yield in excess of 90 per cent upon a single distillation of the reaction mixture.

The organic amines which thus may be employed in accordance with the present invention are those organic amines which have sufficiently basic properties so that they are adapted to neutralize the acidic catalyst that is present in the reaction mixture. Amines which have dissociation constants not less than $1 \times 10^{-11}$ in aqueous solution are suitable. Amines having molecular weights less than about 250 preferably are employed. In general, the amine may be either normally gaseous, normally liquid, or normally solid. The amine may be added either directly to the reaction mixture as a gas, a liquid, or a solid, as the case may be, or in the molten state or dissolved in a suitable inert organic solvent such as an aliphatic or an aromatic hydrocarbon, an ether, a ketone, or the like. Most effective results are obtained through the use of the normally liquid amines. Representative amines which thus may be employed include, for example, gaseous amines such as monomethylamine, monoethylamine, dimethlyamine, and the like, normally solid amines such as naphthylamine, aminediphenylmethane, guanidine, the phenylenediamines, and the like, and the preferred, normally liquid amines such as the picolines, aniline, diethylamine, dipropylamine, N-methlylbutylamine, diamylamine, ethylenediamine, triamylamine, the collidines, pyridine, tributylamine, and other aliphatic or aromatic or heterocyclic amines, or crude mixtures such as coal tar bases and the like containing such amines. The amine preferably is added in an amount sufficient to substantially neutralize the strongly acidic catalyst. In the case of sulfuric acid catalyst, from about one to about two equivalents of amine per mole of sulfuric acid present thus may be employed effectively, although somewhat larger amounts may be used if desired.

After addition of the normally liquid amine the reaction mixture may be distilled immediately or may be allowed to accumulate over a period of time and then be distilled. Distillation, desirably under reduced pressure, is the preferred method of recovering the acrolein diacetate. However, other means may be employed, if desired. When distillation is employed, the acrolein diacetate readily may be separated from any unreacted acrolein and/or acetic anhydride that may be present by the use of suitable fractionation equipment. High boiling materials resulting from the addition of the amine do not interfere with the distillation process, and are readily separated from the acrolein diacetate as high boiling liquid products which may be allowed to remain undistilled.

In place of the sulfuric acid described hereinbefore as the catalyst, there may be used phosphoric acid or para-toluenesulfonic acid in corresponding amounts and with equal effectiveness. The catalytic activity of these materials as applied in the present process, seems to be due to factors in addition to only their acidity, since the present desirable results are not obtained when other acid materials such as trichloracetic acid, and acid salt catalysts such as sodium acid sulfate, zinc chloride, etc., are employed under the conditions of the process.

The present invention provides a process whereby acrolein diacetate may be prepared in high yield, in excess of 90%, by reaction of acrolein and acetic anhydride, and in good quality and in an efficient and economical manner. The following example will serve to illustrate a preferred embodiment of the process of the present invention from the standpoint of quality of product, yield obtained and the like. It will be understood, however, that advantageous results also may be obtained by practicing the process of the invention as it is more broadly described herein, and that this example is not intended to limit unnecessarily such broader aspects of the invention other than as they are defined in the appended claims:

*Example*

Two hundred eighty parts by weight of acrolein were added gradually with agitation to 561 parts of acetic anhydride containing 2.1 parts of concentrated sulfuric acid. The rate of addition was so regulated that the temperature of the mixture was maintained at 50° C. The addition required seven minutes. When the addition was complete, the reaction mixture was maintained at 50° C. for an additional ten minutes. The reaction was continuous and nonviolent, and easily controlled. At the end of this time, 9.5 parts of triisoamylamine were added to the reaction mixture, and the reaction mixture was distilled under reduced pressure. There were recovered 716 parts of acrolein diacetate in a yield of 93%. 6.8 parts of unreaction acrolein and 17.1 parts unreacted acetic anhydride in addition to the excess employed also were recovered. The balance of the reaction mixture consisted of higher boiling materials that were not distilled.

It will be appreciated that the foregoing example may be carried out in a continuous manner as herein described with correspondingly advantageous results.

We claim as our invention:

1. A process of preparing acrolein diacetate which consists in reacting acrolein with acetic anhydride in the presence of sulfuric acid under the correlated conditions of (a) a molar ratio of total acetic anhydride to total acrolein between substantially 1.05:1 and substantially 1.2:1, (b) a reaction temperature between about 40° C. and about 60° C., and (c) an amount of sulfuric acid present between about 0.05 and about 0.5 per cent of the total weight of reactants, limiting the reaction time to a period not in excess of about one hour, and recovering acrolein diacetate from the reaction mixture.

2. A continuous process of preparing acrolein diacetate which consists in mixing a continuous stream of acrolein with a continuous stream of acetic anhydride containing from about 0.05 to about 0.5 per cent of sulfuric acid based on the weight of total acrolein and total acetic anhydride in the resultant mixture, in a proportion corresponding to a molar ratio of total acetic anhydride to total acrolein between substantially 1.05:1 and substantially 1.2:1, maintaining the resultant mixture during reaction in a reaction zone at a temperature between about 35° C. and about 70° C., limiting the reaction time to a period not in excess of about one hour, and recovering acrolein diacetate from the reaction mixture.

3. A process of preparing acrolein diacetate which consists in reacting acrolein with acetic anhydride in the presence of an acidic catalyst selected from the group consisting of sulfuric acid, phosphoric acid, and para-toluenesulfonic acid, under the correlated conditions of (a) a molar ratio of total acetic anhydride to total acrolein between substantially 1.05:1 and substantially 1.2:1, (b) a reaction temperature between about 35° C. and about 70° C., and (c) an amount of the said acid catalyst between about 0.05 and about 0.5 per cent of the total weight of reactants, limiting the reaction time to a period of not in excess of about one hour, and recovering acrolein diacetate from the reaction mixture.

4. A process of preparing acrolein diacetate consisting in reacting acrolein and acetic anhydride present in amounts corresponding to a molar ratio between substantially 1.05:1 and substantially 1.2:1 at a temperature between about 35° C. and about 70° C. in the presence of sulfuric acid in an amount between about 0.05 and about 0.5 per cent by weight of the reactants for a period of time not in excess of about 1 hour, adding to the reaction mixture containing the sulfuric acid an organic amine having a molecular weight less than about 250 and a dissociation constant of at least $1 \times 10^{-11}$ in aqueous solution in an amount sufficient to substantially neutralize the sulfuric acid, thereby terminating the reaction, and thereafter distilling acrolein diacetate from the reaction mixture.

5. In a process of preparing acrolein diacetate wherein acrolein and acetic anhydride are reacted in the presence of a small amount of an acidic catalyst, the catalyst thereafter is neutralized, and acrolein diacetate is recovered from the reaction mixture by distillation, the improvement consisting in neutralizing the acidic catalyst by adding to the reaction mixture containing the same an organic amine having a molecular weight less than about 250 and a dissociation constant of at least $1 \times 10^{-11}$ in aqueous solution in an amount sufficient to neutralize the amount of the acidic catalyst that is present.

6. In a process of preparing acrolein diacetate wherein acrolein and acetic anhydride are reacted in the presence of a small amount of an acidic catalyst, the catalyst thereafter is neutralized, and acrolein diacetate is recovered from the reaction mixture by distillation, the improvement consisting in neutralizing the acidic catalyst by adding to the reaction mixture containing the same a normally liquid organic amine having a molecular weight less than about 250 and a dissociation constant of at least $1 \times 10^{-11}$ in aqueous solution in an amount substantially equivalent to the amount of the acidic catalyst that is present.

7. In a process of preparing acrolein diacetate wherein acrolein and acetic anhydride are reacted in the presence of a small amount of sulfuric acid, the sulfuric acid thereafter is neutralized, and acrolein diacetate is recovered from the reaction mixture by distillation, the improvement consisting in neutralizing the sulfuric acid by adding to the reaction mixture containing the same a normally liquid amine having a molecular weight less than about 250 and a dissociation constant of at least $1 \times 10^{-11}$ in aqueous solution in an amount sufficient to substantially neutralize the amount of the sulfuric acid that is present.

CURTIS W. SMITH.
DOUGLAS G. NORTON.

REFERENCES CITED

The following references are of record in the file of this patent:

UNITED STATES PATENTS

| Number | Name | Date |
|---|---|---|
| 2,312,193 | Richter | Feb. 23, 1943 |
| 2,393,740 | Brant et al. | Jan. 29, 1946 |
| 2,400,727 | Yale | May 21, 1946 |

OTHER REFERENCES

Hubner et al.: "Annalen der chem.," vol. 114 (1860), pp. 47–48.

Wohl et al.: "Berichte," vol. 43 (1910), page 3293.